(12) United States Patent
Kumar et al.

(10) Patent No.: US 12,499,091 B2
(45) Date of Patent: Dec. 16, 2025

(54) PRIORITIZED DEDUPLICATION

(71) Applicant: Dell Products L.P., Round Rock, TX (US)

(72) Inventors: Shiv S. Kumar, Pune (IN); Kaushik Gupta, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/646,188

(22) Filed: Apr. 25, 2024

(65) Prior Publication Data

US 2025/0335397 A1   Oct. 30, 2025

(51) Int. Cl.
*G06F 16/174*   (2019.01)

(52) U.S. Cl.
CPC .................. *G06F 16/1748* (2019.01)

(58) Field of Classification Search
None
See application file for complete search history.

(56) References Cited

U.S. PATENT DOCUMENTS

| | | | |
|---|---|---|---|
| 8,407,191 B1* | 3/2013 | Nanda | G06F 16/1748 707/654 |
| 9,383,936 B1* | 7/2016 | Freitas | G06F 3/0641 |
| 9,864,658 B1* | 1/2018 | Barcello | G06F 11/1453 |
| 2012/0089578 A1* | 4/2012 | Lam | G06F 16/1752 707/E17.001 |
| 2014/0114932 A1* | 4/2014 | Mallaiah | G06F 3/0641 707/E17.032 |
| 2016/0034201 A1* | 2/2016 | Chambliss | G06F 3/0671 711/159 |
| 2017/0147446 A1* | 5/2017 | Zhang | G06F 11/1453 |
| 2017/0147598 A1* | 5/2017 | Sawada | G06F 3/0641 |
| 2019/0384675 A1* | 12/2019 | Klingenberg | G06F 11/1458 |
| 2020/0192589 A1* | 6/2020 | Mehta | G06F 3/061 |
| 2020/0372001 A1* | 11/2020 | Hirose | G06F 16/1748 |
| 2022/0382641 A1* | 12/2022 | Chopra | G06F 16/1748 |

* cited by examiner

*Primary Examiner* — Jorge A Casanova
*Assistant Examiner* — Anugeetha Kunjithapatham
(74) *Attorney, Agent, or Firm* — Amin, Turocy & Watson, LLP

(57) ABSTRACT

A system can determine to perform deduplication on a group of directories in a file system. The system can determine respective deduplication ratios of respective directories of the group of directories, wherein the respective deduplication ratios comprise respective ratios of respective logical sizes of the respective directories to respective physical sizes of the respective directories. The system can perform the deduplication on a first subgroup of the group of directories that have respective deduplication ratios that satisfy a deduplication ratio criterion before performing deduplication on a second subgroup of the group of directories that have respective deduplication ratios that do not satisfy the deduplication ratio criterion.

20 Claims, 10 Drawing Sheets

PRIORITIZED DEDUPLICATION

BACKGROUND

Computers can store computer data. In some instances, multiple copies of particular data can be stored by a computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to perform deduplication on a group of directories in a file system. The system can determine respective deduplication ratios of respective directories of the group of directories, wherein the respective deduplication ratios comprise respective ratios of respective logical sizes of the respective directories to respective physical sizes of the respective directories. The system can perform the deduplication on a first subgroup of the group of directories that have respective deduplication ratios that satisfy a deduplication ratio criterion before performing deduplication on a second subgroup of the group of directories that have respective deduplication ratios that do not satisfy the deduplication ratio criterion.

An example method can comprise determining, by a system comprising at least one processor, respective deduplication ratios of respective directories of a group of directories of a file system, wherein the respective deduplication ratios comprise respective ratios of respective logical sizes of the respective directories to respective physical sizes of the respective directories. The method can further comprise performing first deduplication on a first subgroup of the group of directories that have respective deduplication ratios that satisfy a deduplication ratio criterion before performing second deduplication on a second subgroup of the group of directories that have respective deduplication ratios that do not satisfy the deduplication ratio criterion.

An example non-transitory computer-readable medium can comprise instructions that, in response to execution, cause a system comprising a processor to perform operations. These operations can comprise determining respective deduplication ratios of respective directories of a group of directories of a file system. These operations can further comprise prioritizing an order of a deduplication process on the respective directories based on the respective deduplication ratios.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

There can generally be two types of deduplications (sometimes referred to as dedup or dedupe) operations: inline and offline. Offline deduplications can run at a set time to create space by eliminating duplicated blocks of files. An intent of a dedupe job can be to make space.

A dedupe job can perform a tree walk of a file system, enter each directory, and proceed to process each file in that directory. Consider an example where a job will run for 20 hours, and then it will make space for 50 gigabytes (GB) of data.

It could be that for the first 16 hours, the dedupe job was able to free up only 10 GB, with the remaining 40 GB being freed in the last 4 hours of the job. It can be that there is not a way, according to prior techniques, for a dedupe job to pick specific directories first, which could increase a chance of making more space at an initial phase of a dedupe job.

This problem can be addressed through the present techniques by prioritizing specific directories based on historical data.

The present techniques can be implemented to start working once a dedupe ratio is achieved until now for directories in a deduplication policy. now for each/almost all directory in the deduplication policy.

One phase can involve determining a deduplication ratio for each directory, and can be implemented as follows:
1. As a deduplication job starts, fetch a list of directories to process.
2. Add an extended attribute to each directory, "deduplication ratio."
3. Process files (or the files needed to be processed) in a directory (including children directories) for deduplication.
4. Determine a logical size of a directory by adding together a logical size of files in that directory.
5. Determine a physical size of the directory by adding together a physical size of files in that directory.

6. Determine a deduplication ratio of the directory as the logical size of the directory/physical size of the directory.
7. Save this deduplication ratio to the directory's extended attribute "deduplication ratio."
8. Do this for all the directories.

Another phase can involve prioritizing deduplication processing for higher "deduplication ratio" directory files, and can be implemented as follows:
1. Set a threshold for a high deduplication ratio—"D."
2. While determining a "deduplication ratio" for a directory,
   a. If "deduplication ratio">"D": create a softlink for the directory to some special location (e.g., (/priority-dedupe-paths)).
3. At the time of execution of a deduplication job—first go to priority-dedup-paths.
4. Process the priority-dedup-paths, then move to remaining directories.

Prior techniques can implement a deduplication by performing a tree walk, and working on directories/files as they are encountered.

Example Architecture

Figure 1:
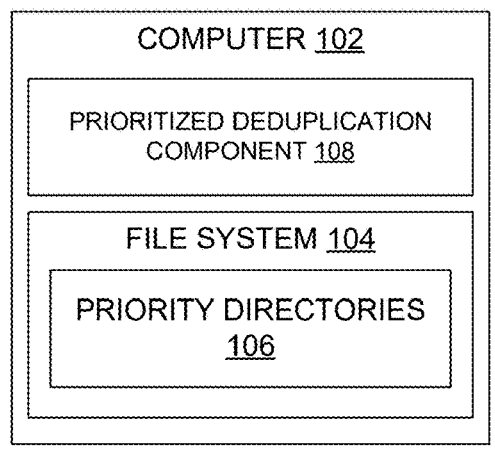
FIG. 1 illustrates an example system architecture that can facilitate prioritized deduplication, in accordance with an embodiment of this disclosure.

FIG. 1 illustrates an example system architecture 100 that can facilitate prioritized deduplication, in accordance with an embodiment of this disclosure.

System architecture 100 comprises computer 102, file system 104, priority directories 106, and prioritized deduplication component 108.

System architecture 100 presents one logical example of implementing the present techniques, and it can be appreciated that there can be other example architectures.

Figure 10:
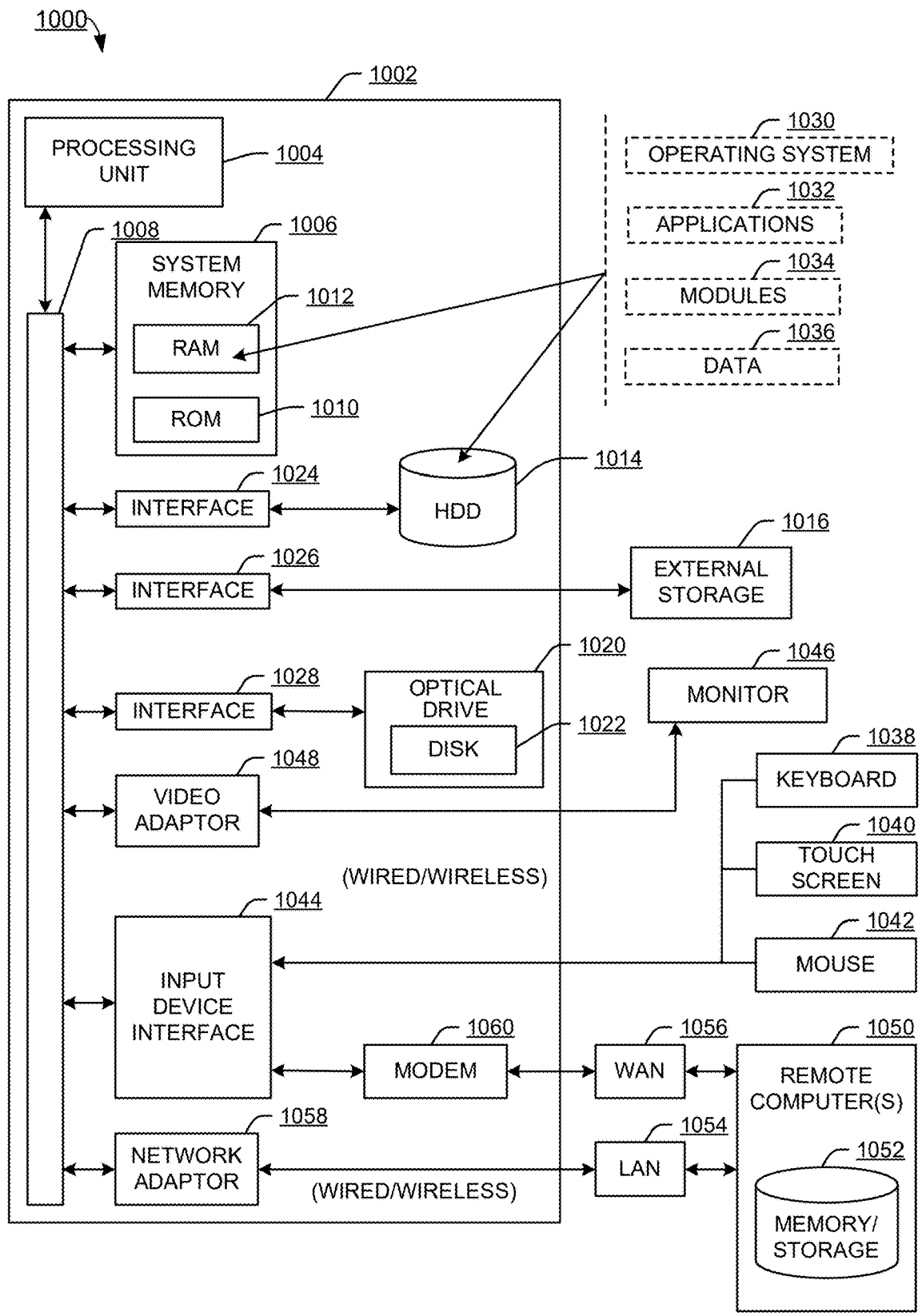
FIG. 10 illustrates an example block diagram of a computer operable to execute an embodiment of this disclosure.

Computer 102 can be implemented with part(s) of computing environment 1000 of FIG. 10.

In some examples, prioritized deduplication component 108 can facilitate prioritized deduplication of a file system path in file system 104. For example, prioritized deduplication component 108 can determine deduplication ratios for directories in a deduplication path of file system 104. Upon starting a deduplication, for directories that have a deduplication ratio above a threshold value, softlinks to those directories can be added to priority directories 106. A softlink can generally comprise a pointer to a particular directory (such as by storing an indication of a path to that directory in file system 104).

Then, directories identified in priority directories 106 can be deduplicated before deduplicating other directories of file system 104 for which deduplication is being performed. In this manner, deduplicating directories with a high deduplication ratio can be prioritized. In some examples, after the current instance of performing deduplication is completed, the directories identified in priority directories 106 can be removed (and priority directories can be re-determined upon executing another instance of performing deduplication).

In some examples, prioritized deduplication component 108 can implement part(s) of the process flows of FIGS. 2-9 to implement prioritized deduplication.

It can be appreciated that system architecture 100 is one example system architecture for prioritized deduplication, and that there can be other system architectures that facilitate prioritized deduplication.

Example Process Flows

Figure 2:
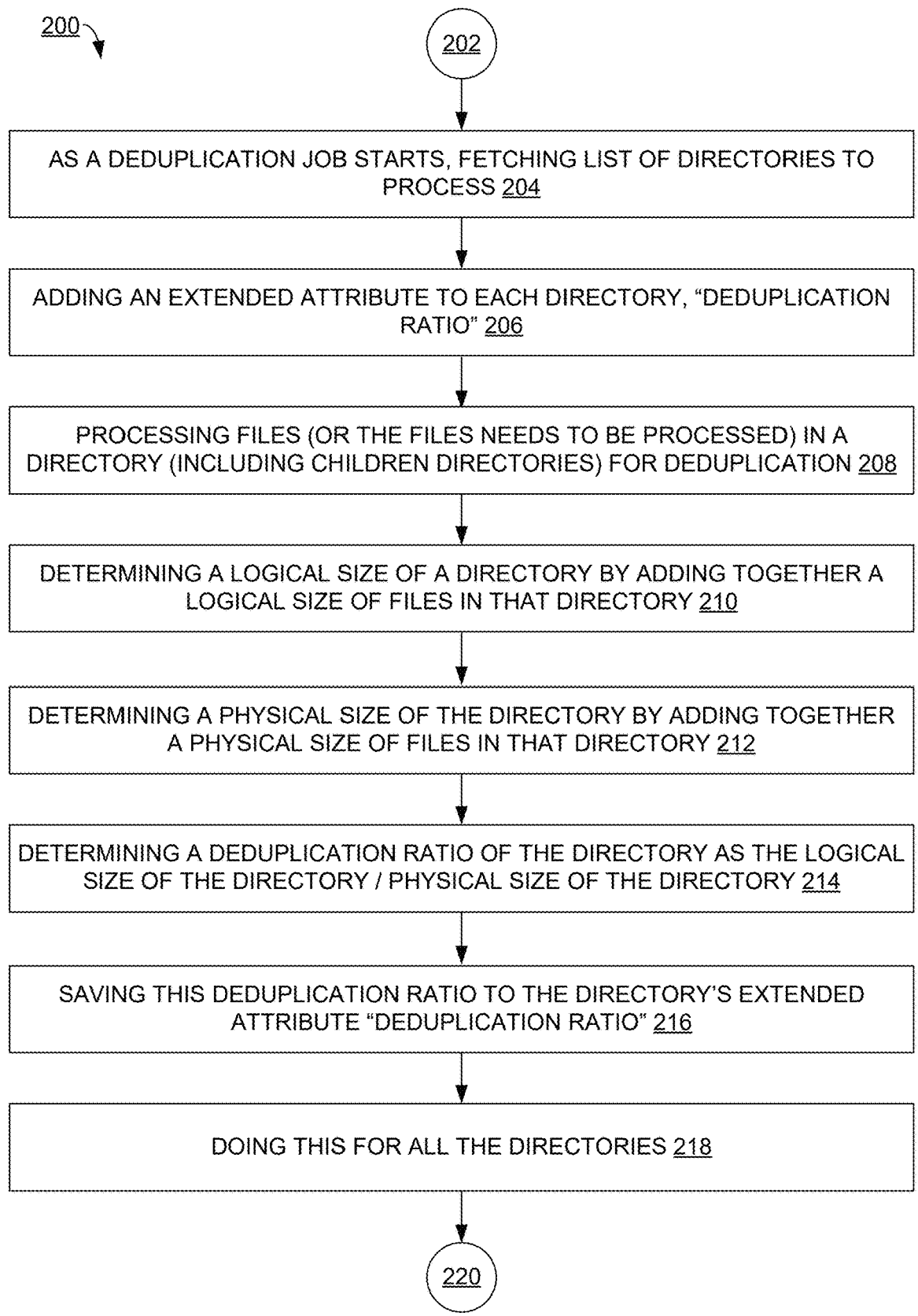
FIG. 2 illustrates an example process flow for creating a backup policy, and that can facilitate prioritized deduplication, in accordance with an embodiment of this disclosure.

FIG. 2 illustrates an example process flow 200 that can facilitate prioritized deduplication, in accordance with an embodiment of this disclosure. In some examples, one or more embodiments of process flow 200 can be implemented by prioritized deduplication component 108 of FIG. 1, or computing environment 1000 of FIG. 10.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 200 begins with 202, and moves to operation 204.

Operation 204 depicts, as a deduplication job starts, fetching list of directories to process.

After operation 204, process flow 200 moves to operation 206.

Operation 206 depicts adding an extended attribute to each directory, "deduplication ratio."

After operation 206, process flow 200 moves to operation 208.

Operation 208 depicts processing files (or the files needed to be processed) in a directory (including children directories) for deduplication.

After operation 208, process flow 200 moves to operation 210.

Operation 210 depicts determining a logical size of a directory by adding together a logical size of files in that directory.

After operation 210, process flow 200 moves to operation 212.

Operation 212 depicts determining a physical size of the directory by adding together a physical size of files in that directory.

After operation 212, process flow 200 moves to operation 214.

Operation 214 depicts determining a deduplication ratio of the directory as the logical size of the directory/physical size of the directory.

After operation 214, process flow 200 moves to operation 216.

Operation 216 depicts saving this deduplication ratio to the directory's extended attribute "deduplication ratio."

After operation 216, process flow 200 moves to operation 218.

Operation 218 depicts doing this for all the directories.

After operation 218, process flow 200 moves to 220, where process flow 200 ends.

Figure 3:
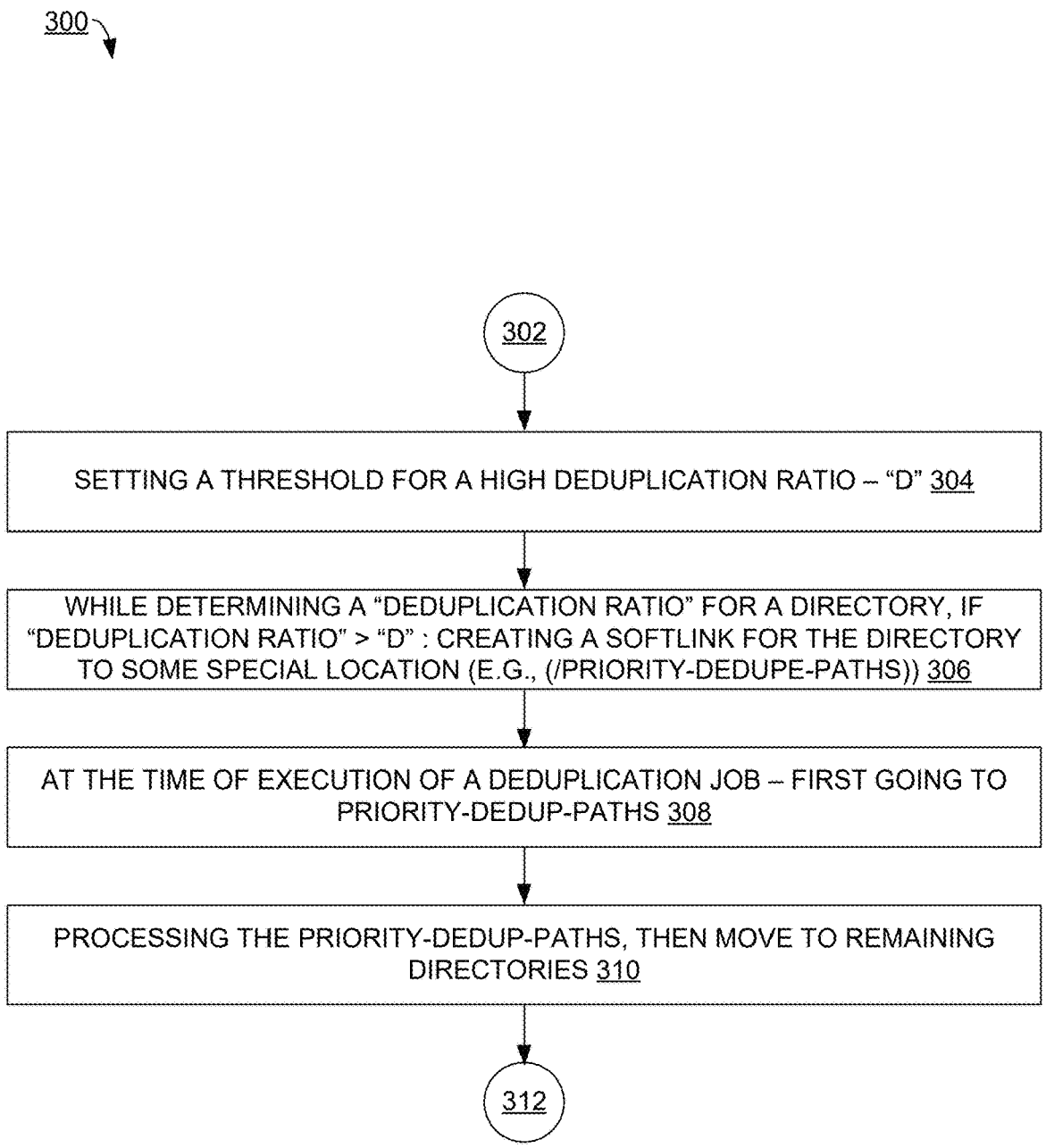
FIG. 3 illustrates another example process flow for a file operation exit callback, and that can facilitate prioritized deduplication, in accordance with an embodiment of this disclosure.

FIG. 3 illustrates an example process flow 300 that can facilitate prioritized deduplication, in accordance with an embodiment of this disclosure. In some examples, one or more embodiments of process flow 300 can be implemented by prioritized deduplication component 108 of FIG. 1, or computing environment 1000 of FIG. 10.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 300 begins with 302, and moves to operation 304.

Operation 304 depicts setting a threshold for a high deduplication ratio-"D."

After operation 304, process flow 300 moves to operation 306.

Operation 306 depicts, while determining a "deduplication ratio" for a directory, if "deduplication ratio">"D": creating a softlink for the directory to some special location (e.g., (/priority-dedupe-paths)).

After operation 306, process flow 300 moves to operation 308.

Operation 308 depicts, at the time of execution of a deduplication job-first going to priority-dedup-paths.

After operation 308, process flow 300 moves to operation 310.

Operation 310 depicts processing the priority-dedup-paths, then moving to remaining directories.

After operation 310, process flow 300 moves to 312, where process flow 300 ends.

Figure 4:
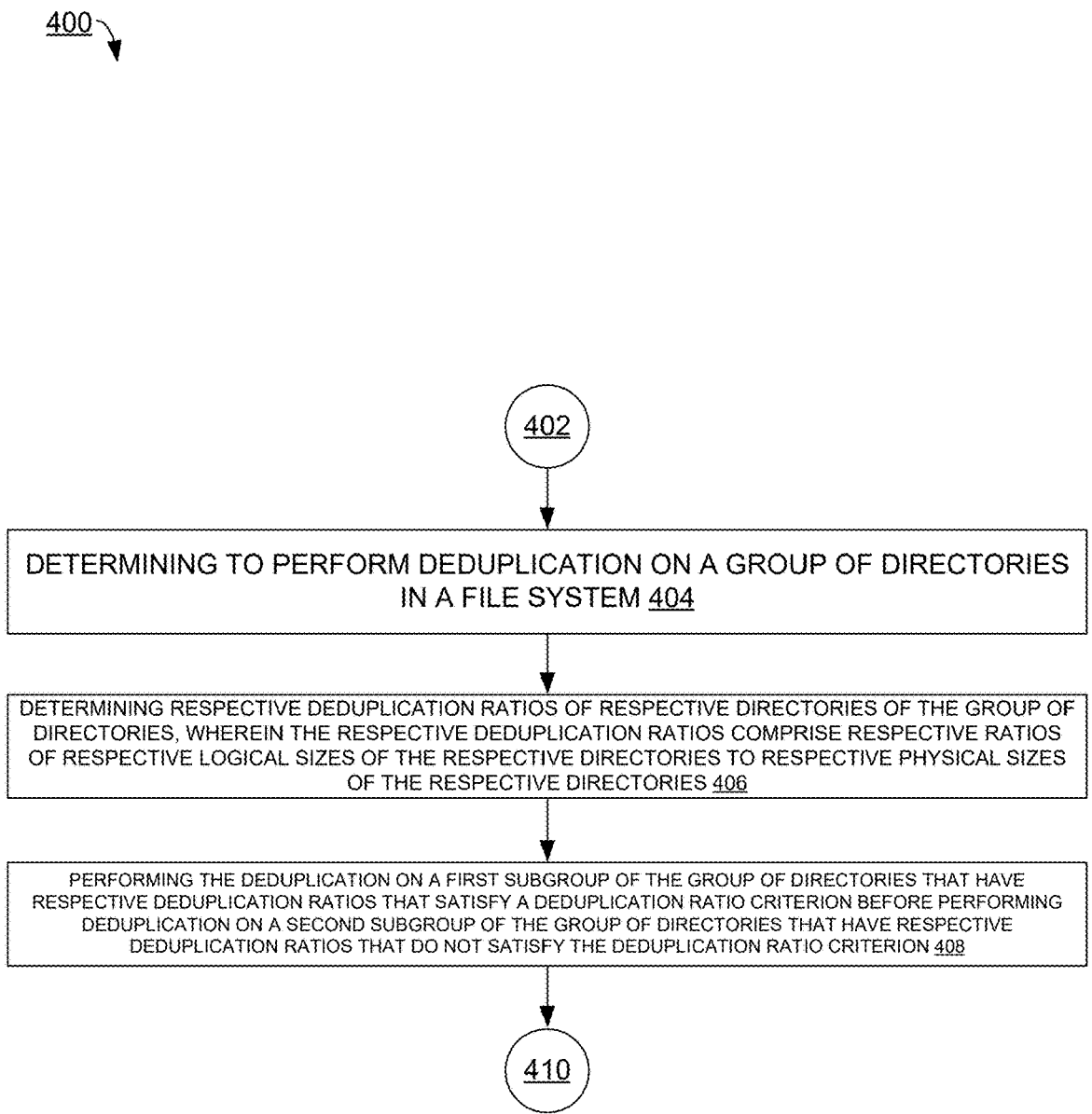
FIG. 4 illustrates an example process flow 400 that can facilitate prioritized deduplication, in accordance with an embodiment of this disclosure.

FIG. 4 illustrates an example process flow 400 that can facilitate prioritized deduplication, in accordance with an embodiment of this disclosure. In some examples, one or more embodiments of process flow 400 can be implemented by prioritized deduplication component 108 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404.

Operation 404 depicts determining to perform deduplication on a group of directories in a file system.

After operation 404, process flow 400 moves to operation 406.

Operation 406 depicts determining respective deduplication ratios of respective directories of the group of directories, wherein the respective deduplication ratios comprise respective ratios of respective logical sizes of the respective directories to respective physical sizes of the respective directories. That is, for each directory that is part of the deduplication, a deduplication ratio for that directory can be performed.

In some examples, the respective logical sizes comprise a sum of respective logical sizes of respective files in the respective directories. This can be implemented in a similar manner as operation 210 of FIG. 2.

In some examples, the respective physical sizes comprise a sum of respective physical sizes of respective files in the respective directories. This can be implemented in a similar manner as operation 212 of FIG. 2.

In some examples, the respective deduplication ratios comprise the respective logical sizes divided by the respective physical sizes. This can be implemented in a similar manner as operation 214 of FIG. 2.

In some examples, determining the respective deduplication ratios of respective directories of the group of directories is based on respective files of respective child directories of the group of directories. This can be implemented in a similar manner as operation 208 of FIG. 2.

After operation 406, process flow 400 moves to operation 408.

Operation 408 depicts performing the deduplication on a first subgroup of the group of directories that have respective deduplication ratios that satisfy a deduplication ratio criterion before performing deduplication on a second subgroup of the group of directories that have respective deduplication ratios that do not satisfy the deduplication ratio criterion. That is, deduplication can be performed on directories with a high deduplication ratio before performing deduplication on directories with a lower deduplication ratio.

After operation 408, process flow 400 moves to 410, where process flow 400 ends.

Figure 5:
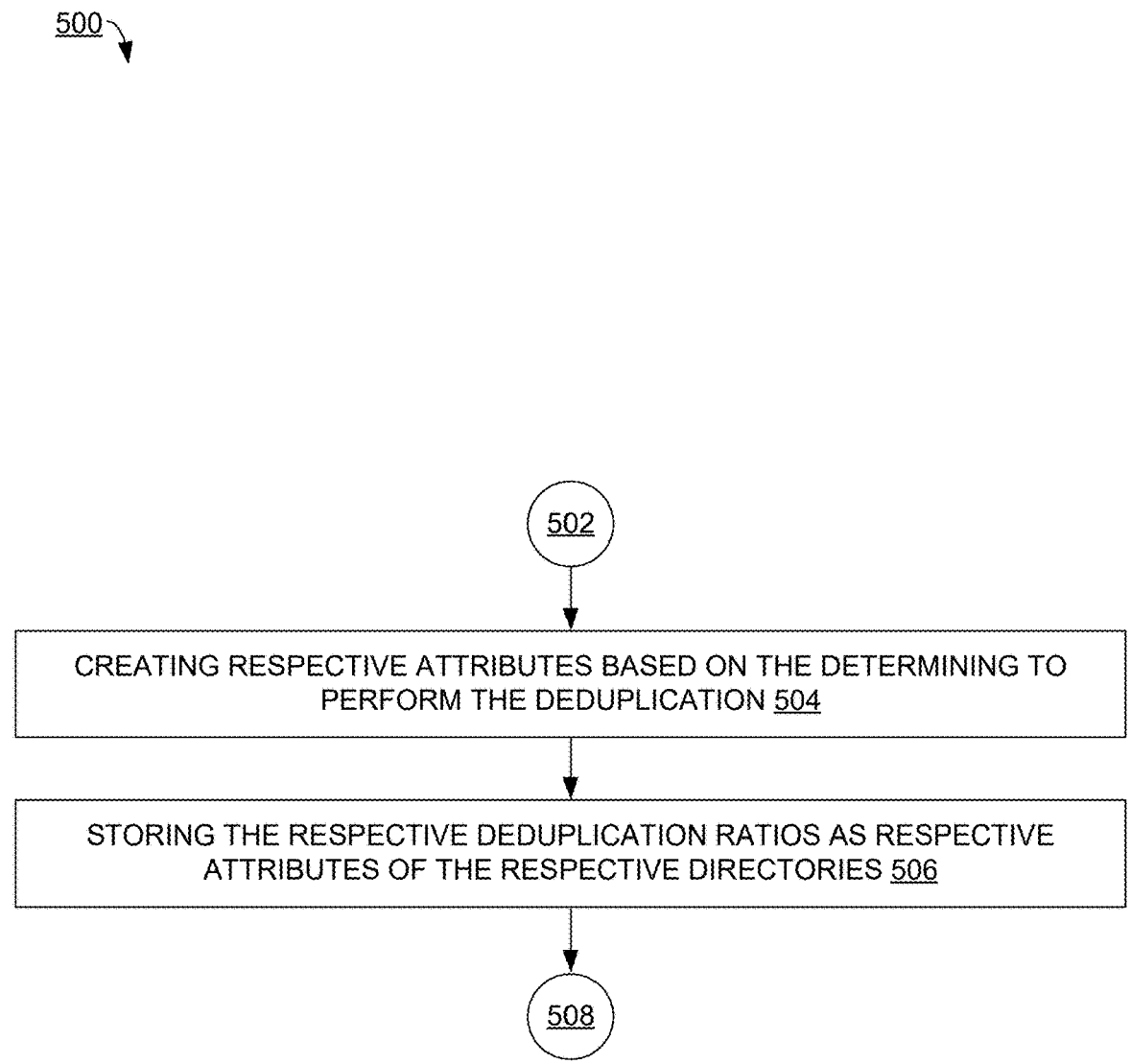
FIG. 5 illustrates an example process flow 500 that can facilitate prioritized deduplication, in accordance with an embodiment of this disclosure.

FIG. 5 illustrates an example process flow 500 that can facilitate prioritized deduplication, in accordance with an embodiment of this disclosure. In some examples, one or more embodiments of process flow 500 can be implemented by prioritized deduplication component 108 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts creating respective attributes based on the determining to perform the deduplication. This can be implemented in a similar manner as operation 206 of FIG. 2.

After operation 504, process flow 500 moves to operation 506.

Operation 506 depicts storing the respective deduplication ratios as respective attributes of the respective directories. This can be implemented in a similar manner as operation 216 of FIG. 2.

After operation 506, process flow 500 moves to 508, where process flow 500 ends.

Figure 6:
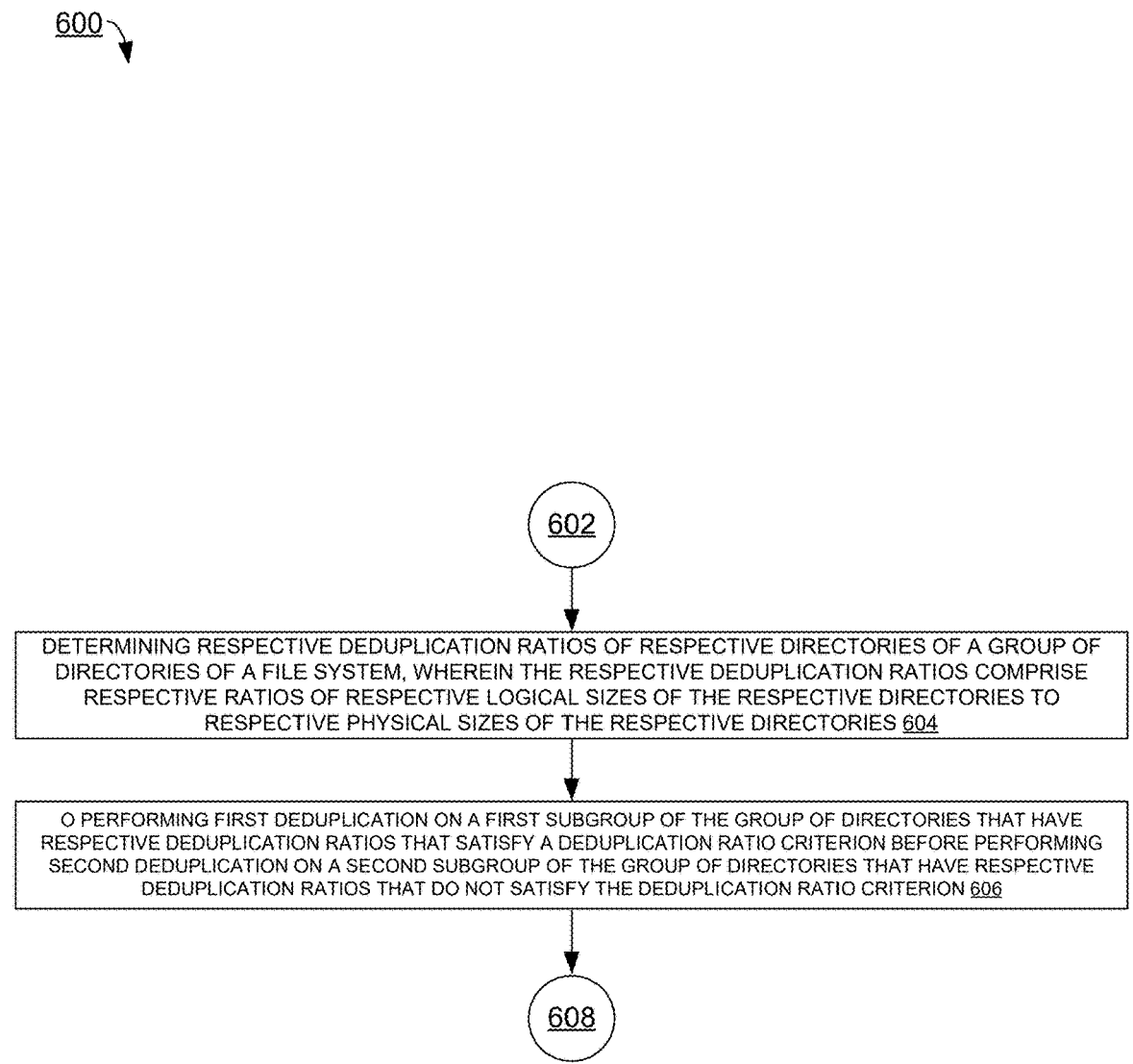
FIG. 6 illustrates another example process flow that can facilitate prioritized deduplication, in accordance with an embodiment of this disclosure.

FIG. 6 illustrates an example process flow 600 that can facilitate prioritized deduplication, in accordance with an embodiment of this disclosure. In some examples, one or more embodiments of process flow 600 can be implemented by prioritized deduplication component 108 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604.

Operation 604 depicts determining respective deduplication ratios of respective directories of a group of directories of a file system, wherein the respective deduplication ratios comprise respective ratios of respective logical sizes of the respective directories to respective physical sizes of the respective directories. In some examples, operation 604 can be implemented in a similar manner as operation 406 of FIG. 4.

In some examples, the determining of the respective deduplication ratios is performed based on determining to perform the first deduplication and the second deduplication. That is, deduplication ratios can be determined at runtime of a deduplication job for which the ratios will be used.

After operation 604, process flow 600 moves to operation 606.

Operation 606 depicts performing first deduplication on a first subgroup of the group of directories that have respective deduplication ratios that satisfy a deduplication ratio criterion before performing second deduplication on a second subgroup of the group of directories that have respective deduplication ratios that do not satisfy the deduplication ratio criterion. In some examples, operation 606 can be implemented in a similar manner as operation 408 of FIG. 4.

In some examples, at least one of the first deduplication or the second deduplication comprises removing duplicate copies of data from the file system.

In some examples, at least one of the first deduplication or the second deduplication comprises an offline deduplication that runs at a set time. In some examples, at least one of the first deduplication or the second deduplication is performed at a block level of the file system. That is, an offline deduplication can run at a set time to make space by eliminating duplicated blocks of files.

After operation 606, process flow 600 moves to 608, where process flow 600 ends.

Figure 7:
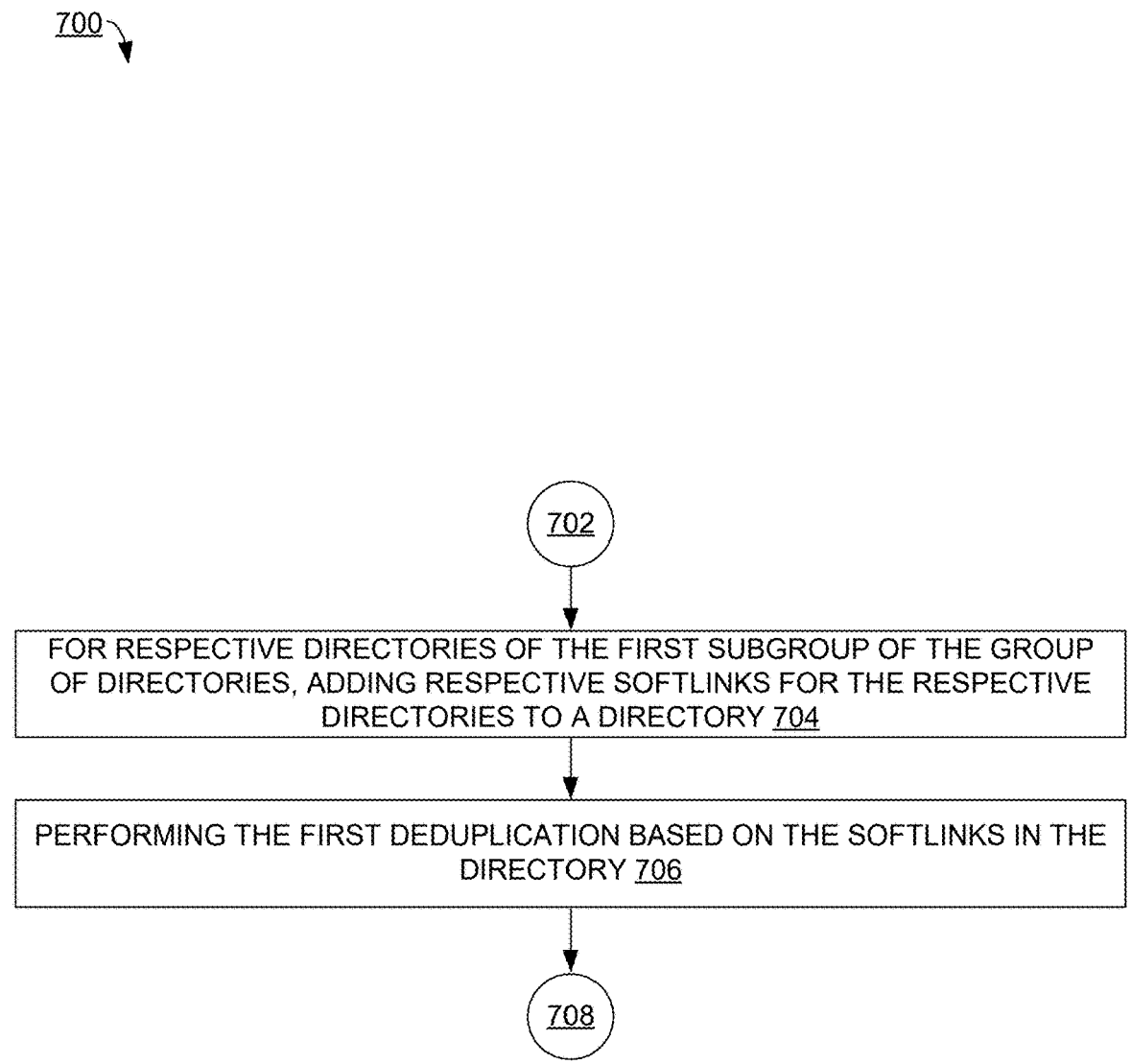
FIG. 7 illustrates another example process flow that can facilitate prioritized deduplication, in accordance with an embodiment of this disclosure.

FIG. 7 illustrates an example process flow 700 that can facilitate prioritized deduplication, in accordance with an embodiment of this disclosure. In some examples, one or more embodiments of process flow 700 can be implemented by prioritized deduplication component 108 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704.

Operation 704 depicts, for respective directories of the first subgroup of the group of directories, adding respective softlinks for the respective directories to a directory. This can be implemented in a similar manner as operation 306 of FIG. 3.

After operation 704, process flow 700 moves to operation 706.

Operation 706 depicts performing the first deduplication based on the softlinks in the directory. That is, directories associated with the softlinks can be deduplicated before deduplication is performed on other directories.

After operation 706, process flow 700 moves to 708, where process flow 700 ends.

Figure 8:
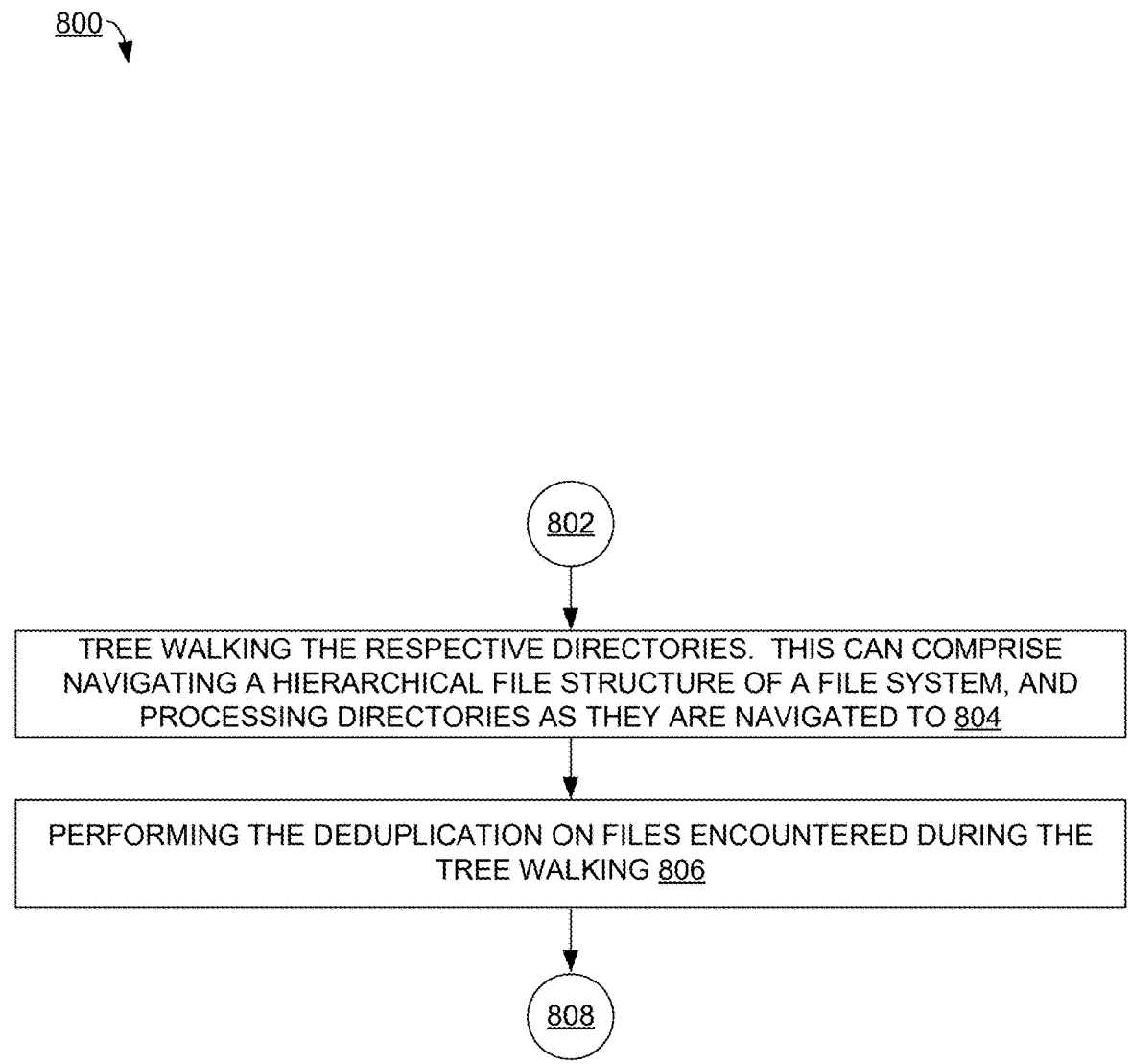
FIG. 8 illustrates another example process flow that can facilitate prioritized deduplication, in accordance with an embodiment of this disclosure.

FIG. 8 illustrates an example process flow 800 that can facilitate prioritized deduplication, in accordance with an embodiment of this disclosure. In some examples, one or more embodiments of process flow 800 can be implemented by prioritized deduplication component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804.

Operation 804 depicts tree walking the respective directories. This can comprise navigating a hierarchical file structure of a file system, and processing directories as they are navigated to.

After operation 804, process flow 800 moves to operation 806.

Operation 806 depicts performing the deduplication on files encountered during the tree walking. That is, when a directory is encountered in operation 804, the directory can be entered, and the files in that directory can be processed for deduplication.

After operation 806, process flow 800 moves to 808, where process flow 800 ends.

Figure 9:
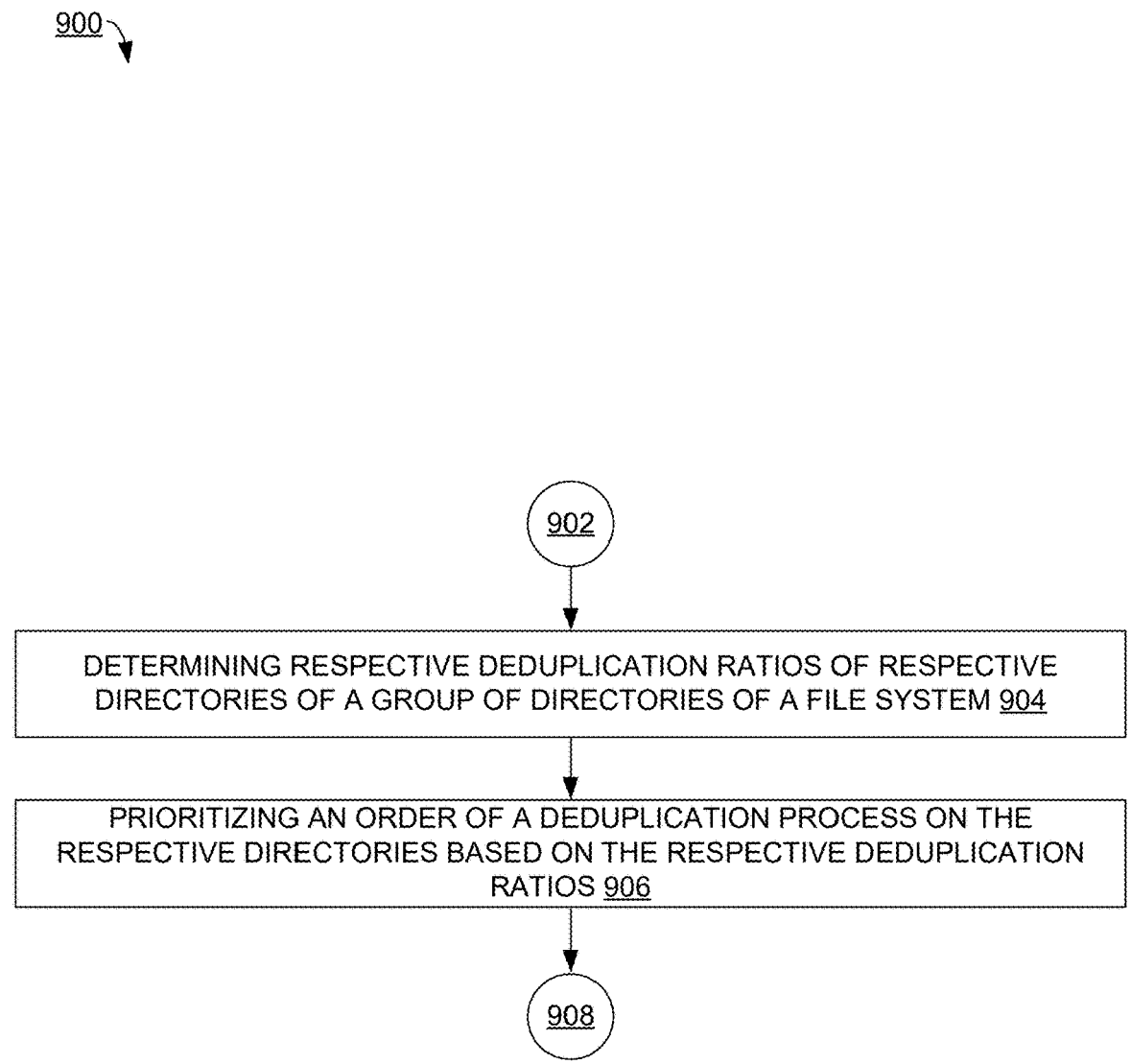
FIG. 9 illustrates another example process flow that can facilitate prioritized deduplication, in accordance with an embodiment of this disclosure.

FIG. 9 illustrates an example process flow 900 that can facilitate prioritized deduplication, in accordance with an embodiment of this disclosure. In some examples, one or more embodiments of process flow 900 can be implemented by prioritized deduplication component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904.

Operation 904 depicts determining respective deduplication ratios of respective directories of a group of directories of a file system.

In some examples, the respective deduplication ratios comprise respective ratios of respective logical sizes of the respective directories to respective physical sizes of the respective directories.

In some examples, operation 904 comprises, for respective directories of the first group of the group of directories, adding respective softlinks for the respective directories to a directory, and wherein performing the deduplication process on the first group of the group of directories comprises performing the deduplication process based on the softlinks in the directory.

After operation 904, process flow 900 moves to operation 906.

Operation 906 depicts prioritizing an order of a deduplication process on the respective directories based on the respective deduplication ratios.

In some examples, prioritizing the order of the deduplication process comprises performing the deduplication process on a first group of the group of directories that have respective deduplication ratios that satisfy a deduplication ratio criterion before performing the deduplication process on a remaining group of the group of directories.

In some examples, the deduplication ratio criterion is a threshold value, and respective first directories of the first group of the group of directories have respective deduplication ratios that are greater than the threshold value. That is, directories with high deduplication ratios can be prioritized over directories with lower deduplication ratios.

In some examples, operation 906 comprises storing the respective deduplication ratios as respective metadata of the respective directories, and performing the deduplication process on the first group of the group of directories that have respective deduplication ratios that satisfy a deduplication ratio is based on the respective metadata.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer 102.

In some examples, computing environment 1000 can implement one or more embodiments of the process flows of FIGS. 2-9 to facilitate prioritized deduplication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    at least one processor; and
    at least one memory that stores executable instructions that, when executed by the at least one processor, facilitate performance of operations, comprising:
        determining to perform deduplication on a group of directories in a file system;
        before performing the deduplication,
            determining respective deduplication ratios of respective directories of the group of directories, wherein the respective deduplication ratios comprise respective ratios of respective logical sizes of the respective directories to respective physical sizes of the respective directories,
            identifying a first subgroup of the group of directories that have first respective deduplication ratios of the respective deduplication ratios that satisfy a deduplication ratio criterion, and
            identifying a second subgroup of the group of directories that have second respective deduplication ratios of the respective deduplication ratios that do not satisfy the deduplication ratio criterion; and
        after the determining of the respective deduplication ratios of the respective directories, performing the deduplication on the first subgroup of the group of directories that have the first respective deduplication ratios that satisfy the deduplication ratio criterion; and
        after the performing of the deduplication on the first subgroup, performing the deduplication on the second subgroup of the group of directories that have the second respective deduplication ratios that do not satisfy the deduplication ratio criterion.

2. The system of claim 1, wherein the operations further comprise:
    storing the respective deduplication ratios as respective attributes of the respective directories.

3. The system of claim 2, wherein the operations further comprise:
    creating the respective attributes based on the determining to perform the deduplication.

4. The system of claim 1, wherein the respective logical sizes comprise a sum of respective logical sizes of respective files in the respective directories.

5. The system of claim 1, wherein the respective physical sizes comprise a sum of respective physical sizes of respective files in the respective directories.

6. The system of claim 1, wherein the respective deduplication ratios comprise the respective logical sizes divided by the respective physical sizes.

7. The system of claim 1, wherein determining the respective deduplication ratios of respective directories of the group of directories is based on respective files of respective child directories of the group of directories.

8. A method, comprising:
    determining, by a system comprising at least one processor and before performing a first deduplication, respective deduplication ratios of respective directories of a group of directories of a file system, wherein the respective deduplication ratios comprise respective ratios of respective logical sizes of the respective directories to respective physical sizes of the respective directories;
    before performing the first deduplication, identifying, by the system, a first subgroup of the group of directories that have first respective deduplication ratios of the respective deduplication ratios that satisfy a deduplication ratio criterion, and a second subgroup of the group of directories that have second respective deduplication ratios t of the respective deduplication ratios hat do not satisfy the deduplication ratio criterion; and
    performing the first deduplication on the first subgroup of the group of directories that have the first respective deduplication ratios that satisfy the deduplication ratio criterion before performing second deduplication on the second subgroup of the group of directories that have the second respective deduplication ratios that do not satisfy the deduplication ratio criterion.

9. The method of claim 8, wherein at least one of the first deduplication or the second deduplication comprises removing duplicate copies of data from the file system.

10. The method of claim 8, wherein the determining of the respective deduplication ratios is performed based on determining to perform the first deduplication and the second deduplication.

11. The method of claim 8, further comprising:
    for respective directories of the first subgroup of the group of directories, adding respective softlinks for the respective directories to a directory, and wherein performing the first deduplication on the first subgroup of the group of directories comprises performing the first deduplication based on the softlinks in the directory.

12. The method of claim 8, wherein at least one of the first deduplication or the second deduplication comprises an offline deduplication that runs at a set time.

13. The method of claim 8, wherein at least one of the first deduplication or the second deduplication is performed at a block level of the file system.

14. The method of claim 8, wherein performing the deduplication comprises:
    tree walking the respective directories; and
    performing the deduplication on files encountered during the tree walking.

15. A non-transitory computer-readable medium comprising instructions that, in response to execution, cause a system comprising at least one processor to perform operations, comprising:
    before performing a deduplication process on respective directories of a group of directories of a file system, determining respective deduplication ratios of the respective directories, a first group of the group of directories that have first respective deduplication ratios of the respective deduplication ratios that satisfy a deduplication ratio criterion, and a second group of the group of directories that have second respective deduplication ratios of the respective deduplication ratios that do not satisfy the deduplication ratio criterion, wherein the respective deduplication ratios comprise respective ratios of respective logical sizes of the respective directories to respective physical sizes of the respective directories; and
    performing the deduplication process on the first group of the group of directories before performing the deduplication process on the second group of the group of directories.

16. The non-transitory computer-readable medium of claim 15, wherein the deduplication ratio criterion is a threshold value, and wherein respective first directories of the first group of the group of directories have the first respective deduplication ratios that are greater than the threshold value.

17. The non-transitory computer-readable medium of claim 15, wherein the operations further comprise:
    for respective directories of the first group of the group of directories, adding respective softlinks for the respective directories to a directory, and wherein performing the deduplication process on the first group of the group of directories comprises performing the deduplication process based on the softlinks in the directory.

18. The non-transitory computer-readable medium of claim 15, wherein the operations further comprise:
    storing the respective deduplication ratios as respective metadata of the respective directories; and
    wherein performing the deduplication process on the first group of the group of directories that have the first respective deduplication ratios that satisfy the deduplication ratio criterion is based on the respective metadata.

19. The non-transitory computer-readable medium of claim 15, wherein the operations further comprise:
    storing the respective deduplication ratios as respective attributes of the respective directories.

20. The method of claim 8, further comprising:
    storing, by the system, the respective deduplication ratios as respective attributes of the respective directories.

* * * * *